United States Patent
Chang

(10) Patent No.: US 8,175,019 B2
(45) Date of Patent: May 8, 2012

(54) WIRELESS NETWORK CONNECTION DEVICE AND METHOD

(75) Inventor: Chung-Yao Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 287 days.

(21) Appl. No.: 12/687,547

(22) Filed: Jan. 14, 2010

(65) Prior Publication Data

US 2010/0177728 A1    Jul. 15, 2010

(30) Foreign Application Priority Data

Jan. 14, 2009    (TW) .............................. 98101194 A

(51) Int. Cl.
*G08C 17/00* (2006.01)
*H04W 4/00* (2009.01)
*H04W 52/52* (2009.01)
*H04B 1/10* (2006.01)

(52) U.S. Cl. ........ 370/311; 370/332; 370/338; 455/63.1

(58) Field of Classification Search .......... 370/310–350; 455/63.1, 67.13, 114.2–115.4, 125, 127.2, 455/134, 136, 245.1, 434, 501, 504–505, 455/570

See application file for complete search history.

(56) References Cited

U.S. PATENT DOCUMENTS

| 6,081,558 | A | * | 6/2000 | North | 375/316 |
| 6,201,954 | B1 | * | 3/2001 | Soliman | 455/226.2 |
| 7,110,736 | B2 | * | 9/2006 | Darabi | 455/240.1 |
| 8,030,993 | B2 | * | 10/2011 | Li | 327/560 |

FOREIGN PATENT DOCUMENTS

CN    1534887    10/2004

* cited by examiner

*Primary Examiner* — Tri H Phan
(74) *Attorney, Agent, or Firm* — Muncy, Geissler, Olds & Lowe, PLLC

(57) ABSTRACT

A wireless network connection device and method are provided for setting a wireless connection to an access point (AP). The device includes a radio frequency (RF) module, a base band (BB) module, and a control module. The RF module receives a packet transmitted by the AP. The BB module processes the packet to generate a signal strength (SS) corresponding to the AP. The control module generates an adjustment signal according to the SS, and adjusts a gain of the RF module according to the adjustment signal.

18 Claims, 6 Drawing Sheets

WIRELESS NETWORK CONNECTION DEVICE AND METHOD

CROSS-REFERENCES TO RELATED APPLICATIONS

This non-provisional application claims priority under 35 U.S.C. §119(a) on Patent Application No. 98101194 filed in Taiwan, R.O.C. on Jan. 14, 2009, the entire contents of which are hereby incorporated by reference.

BACKGROUND

1. Technical Field

The disclosure relates to a network connection device and method, and more particularly to a wireless network connection device and method.

2. Related Art

In applications of a wireless local area network (WLAN), a plurality of access points (APs) work in a specific area. A user only needs to be connected to one specific AP to perform wireless transmission of data through a wireless network.

A user is coupled to an AP through a station (STA) to establish a wireless network connection. When an STA S1 is coupled to an AP A1, wireless transmission between another AP A2 and another STA S2 constitutes interference to the STA S1. Without a suitable processing mechanism, the interference severely affects STA S1 transmission efficiency and quality Moreover, the STA sometimes moves far away from the originally coupled AP with the movement of the STA (as a result of user movement), causing difficulty in data transmission or disconnection, and in such cases the connection must be reestablished. In the prior art, the number of false alarms (FAs) serves as a reference for the adjustment of an initial gain.

SUMMARY

In view of the above, the disclosure is directed to a wireless network connection device and method intended to overcome these problems.

The disclosure provides a wireless network connection device and method, in which a signal strength (SS) is used to suitably adjust a gain of the wireless network connection device, such that the wireless network connection device achieves robust connection within a wireless network system, thus improving wireless transmission efficiency and quality.

The disclosure provides a wireless network connection device for wireless connecting to an access point (AP). The device includes a radio frequency (RF) module, a base band (BB) module, and a control module. The RF module receives a packet transmitted by the AP. The BB module processes the packet to generate an SS corresponding to the AP. The control module generates an adjustment signal according to the SS and adjusts a gain of the RF module according to the adjustment signal. The adjustment signal is adjusted to substantially establish a specific relationship between the gain and the SS.

The disclosure further provides a wireless network connection method for setting a wireless connection to an AP, which includes the following steps. A packet transmitted by the AP is received. The packet is processed to generate an SS corresponding to the AP. An adjustment signal is generated according to the SS. A gain of the wireless network connection is adjusted according to the adjustment signal. The adjustment signal is adjusted to substantially establish a specific relationship between the gain and the SS.

Embodiments and effects of the disclosure are illustrated below with reference to the accompanying drawings.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
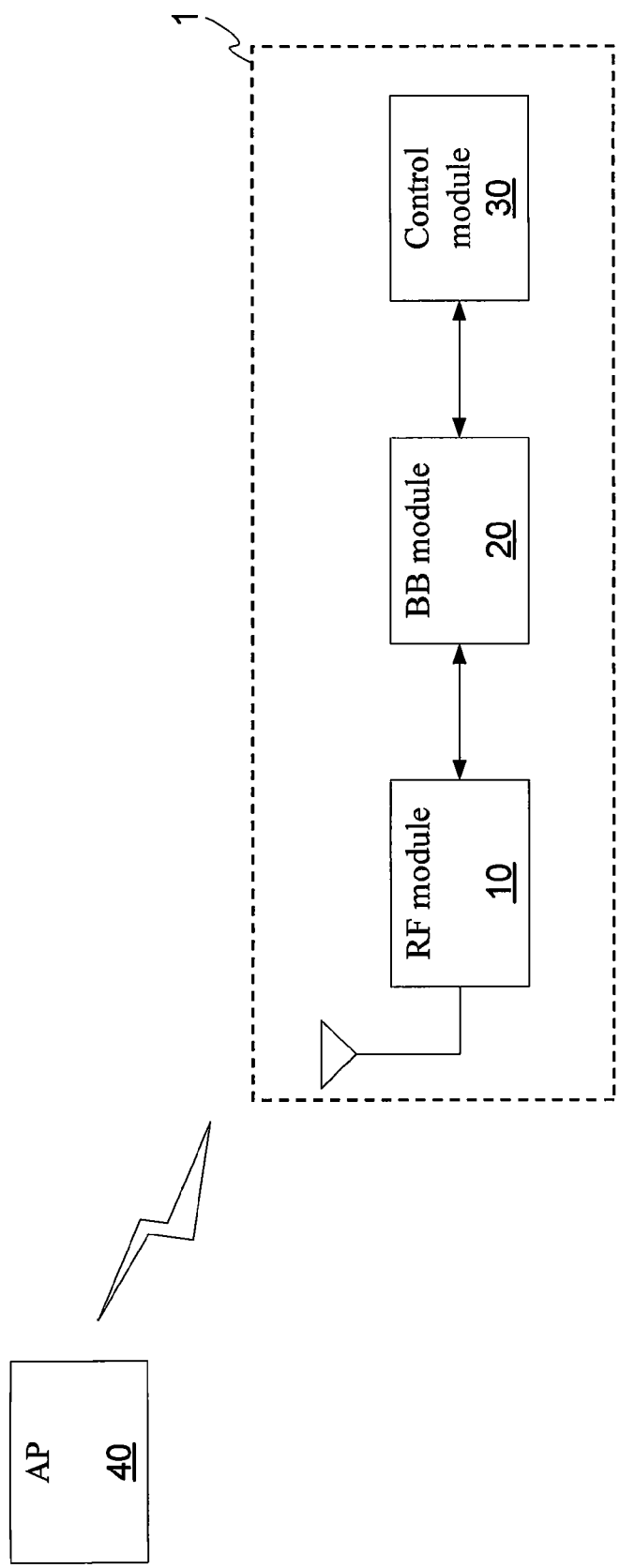
FIG. 1 is a schematic view of a wireless network connection device according to a first embodiment of the disclosure.

FIG. 1 is a schematic view of a wireless network connection device according to a first embodiment of the disclosure. The embodiment provides a wireless network connection device 1 for setting a wireless connection to an access point (AP) 40. The device includes a radio frequency (RF) module 10, a base band (BB) module 20, and a control module 30.

The RF module 10 receives a packet transmitted by the AP 40. After the BB module 20 processes the packet, a signal strength (SS) corresponding to the AP 40 is obtained. In this embodiment, the packet may be a beacon packet, and the BB module 20 calculates information transmitted in the beacon packet, so as to obtain strength of the SS corresponding to the AP 40 at the moment when the RF module 10 receives the beacon packet transmitted by the AP 40.

The control module 30 generates a corresponding adjustment signal according to the SS, and adjusts a gain of the RF module 10 according to the adjustment signal. When the SS is smaller, it indicates that connection strength between the AP 40 and the wireless network connection device 1 is weaker. Therefore, to avoid disconnection due to too weak signals between the wireless network connection device 1 and the AP 40, the control module 30 increases the gain of the RF module 10, so as to increase the connection strength between the wireless network connection device 1 and the AP 40. Conversely, when the SS is greater, it indicates that the connection strength between the AP 40 and the wireless network connection device 1 is stronger. The control module 30 therefore lowers the gain of the RF module 10, so as to reduce a coverage of the wireless network connection device 1, thus avoiding influence on throughput (TP) of transmission between the AP 40 and the wireless network connection device 1 caused by too much interference generated when too many transmission signals between other APs and other stations (STA) are transmitted in a wireless network environment.

Therefore, the value of the gain is inversely proportional to the SS as can be seen from the description above. That is to say, when the SS is great, the control module 30 lowers the gain, and when the SS is small, the control module 30 increases the gain.

Figure 2:
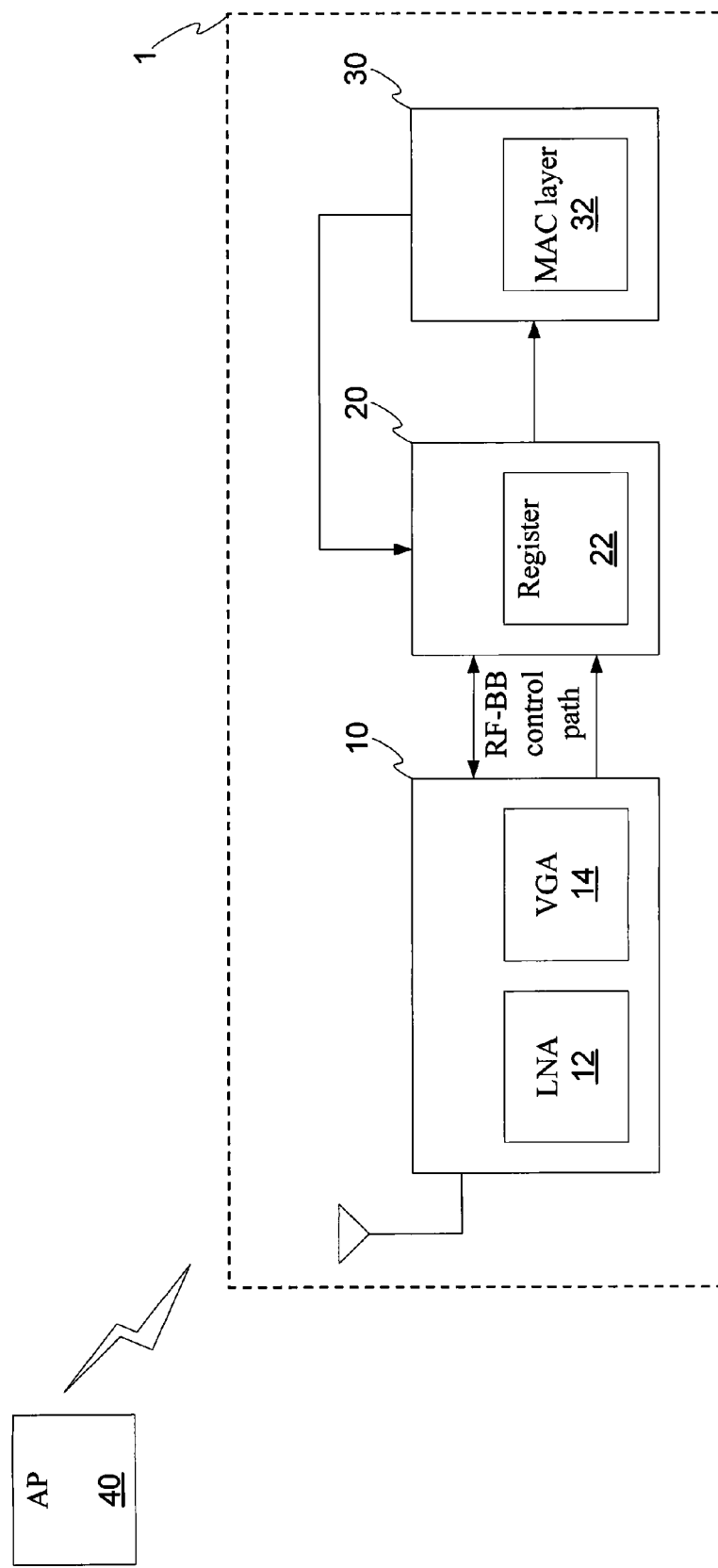
FIG. 2 is a schematic view of a wireless network connection device according to a second embodiment of the disclosure.

FIG. 2 is a schematic view of a wireless network connection device according to a second embodiment of the disclosure. In the second embodiment, it can be found that the RF module 10 includes a low noise amplifier (LNA) 12 and/or a voltage gain amplifier (VGA) 14. Thus, the control module 30 adjusts a gain of the LNA 12 and/or the VGA 14 according to the adjustment signal.

In addition, the BB module 20 may include a register 22. When the control module 30 generates an adjustment signal according to the SS, the adjustment signal is firstly stored temporarily in the register 22. Next, the BB module 20 transmits the adjustment signal to the RF module 10 through a control path between the RF module 10 and the BB module 20 (RF-BB control path).

Moreover, the control module 30 may include a media access control (MAC) layer 32. The MAC layer 32 is a unit in most common wireless network devices. It may be determined whether the packet is sent by a desired AP 40 or not and whether the packet actually needs to be transmitted to the wireless network connection device 1 or not according to a MAC address; if yes, the adjustment signal is generated according to the SS in the packet. In addition, the control module 30 may include a driver for driving the wireless network connection device 1, such that the wireless network connection device 1 may communicate with an electronic device (for example, a computer system), coupled to the wireless network connection device 1.

In the wireless network environment, many factors change the SS between the wireless network connection device 1 and the AP 40. Therefore, in order to adjust the gain dynamically, the control module 30 extracts an updated value of the SS from the BB module 20 at a predetermined time interval, so as to update the adjustment signal. The gain of the RF module 10 is thus dynamically adjusted. As can be seen, according to the SS between the AP 40 and the wireless network connection device 1, the wireless network connection device 1 may dynamically adjust the gain coupled to the AP 40, such that degradation of connection quality due to interferences is avoided, and disconnection between the wireless network connection device 1 and the AP 40 is prevented.

In addition, in order to prevent the problem of disconnection or the RF module 10 being unable to receive a packet as a result of a sudden decrease of the SS of the wireless network connection device 1 caused by excessive user movement or by multipath, the control module 30 may first subtract a predetermined value from the SS when receiving the SS (for example, 10 dB), and subsequently generate an adjustment signal according to the SS with the predetermined value SS subtracted. The SS is reduced by a predetermined value (the predetermined value may be not less than 3 dB, for example, 10 dB). The adjusted gain may be slightly greater than the adjusted gain when the predetermined value is not reduced. That is to say, the gain of the RF module 10 may be changed more, thus ensuring that the connection quality is not affected due to disconnection caused by slight influence (for example, user movement or multipath).

Figure 3A:
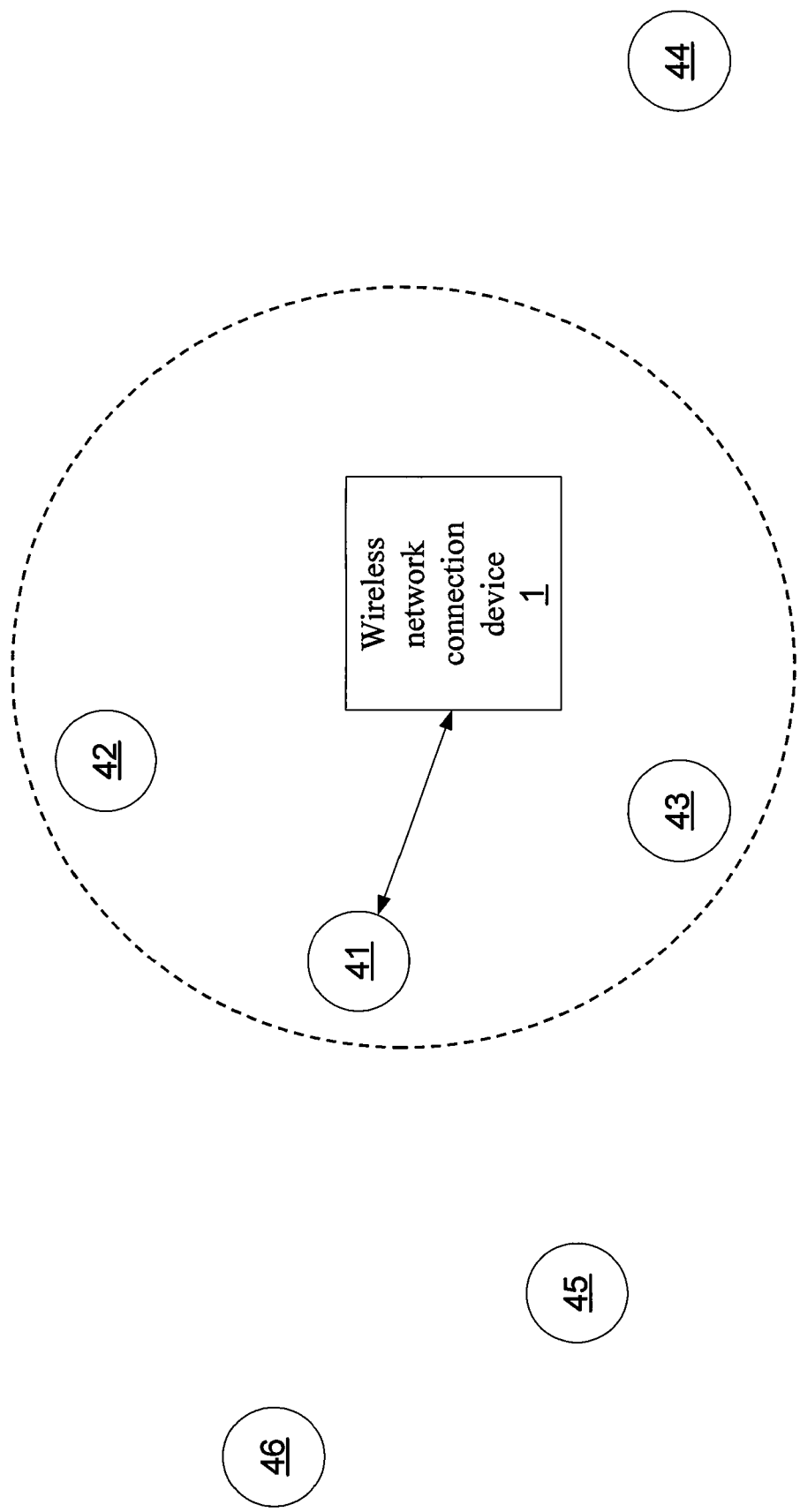
FIG. 3A is a schematic view of a first wireless network connection status according to the disclosure.

Examples of using a wireless network connection status generated by the wireless network connection device 1 provided in the embodiment are described as follows. FIG. 3A is a schematic view of a first wireless network connection status according to the disclosure. When the wireless network connection device 1 is enabled, a site survey is first performed. As shown in FIG. 3A, six APs 41 to 46 are found at this time. It is assumed that the AP 41 is selected to establish a connection. Therefore, the RF module 10 of the wireless network connection device 1 receives a packet transmitted by the AP 41, and the packet is transmitted to the BB module 20 to be decoded to generate an SS corresponding to the AP 41 at this time. Finally, the control module 30 generates an adjustment signal according to the SS, and adjusts a gain to a suitable value according to the adjustment signal. In this state, the final objective is to establish a connection with the AP 41.

Figure 3B:
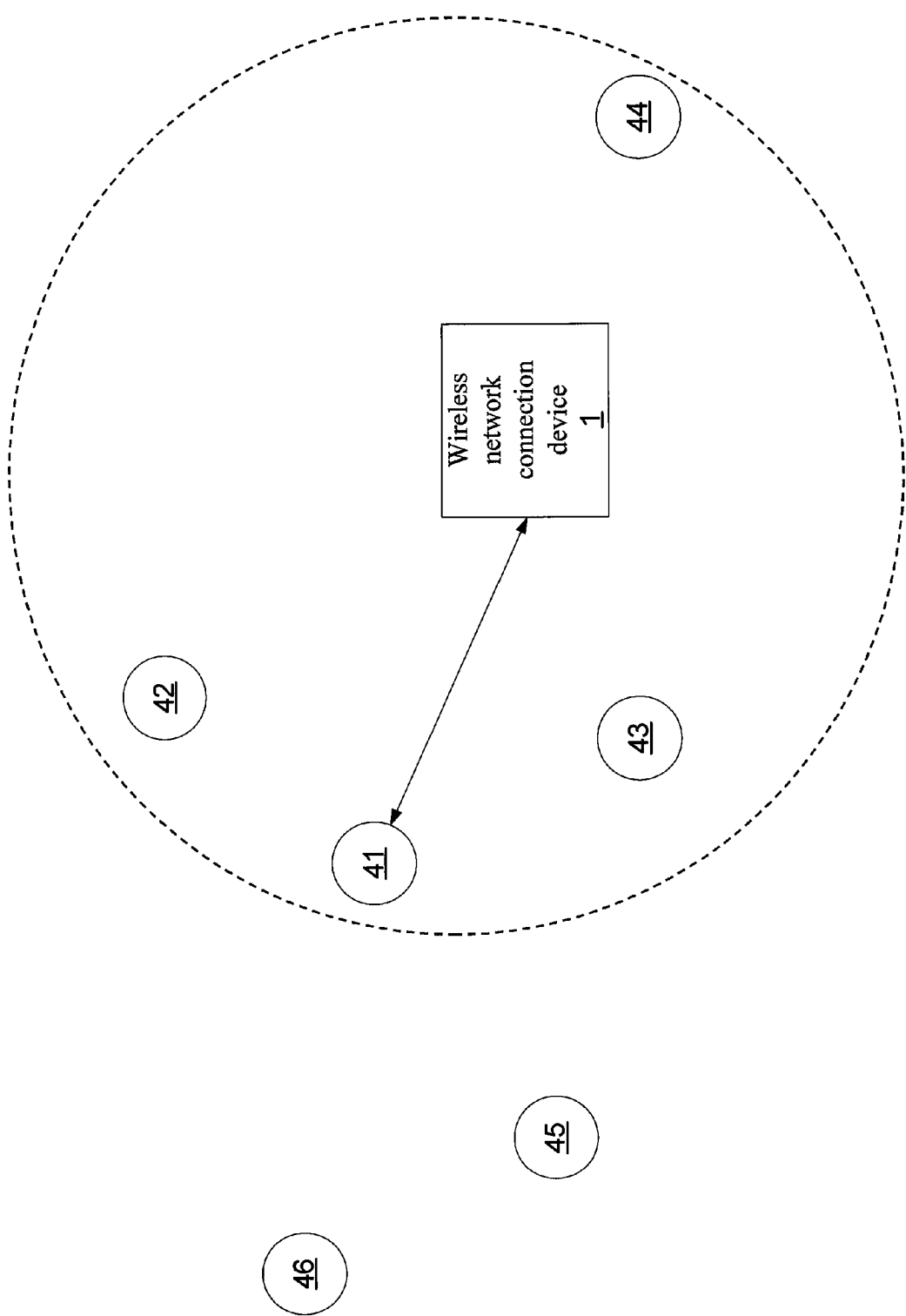
FIG. 3B is a schematic view of a second wireless network connection status according to the disclosure.

FIG. 3B is a schematic view of a second wireless network connection status according to the disclosure. In this state, the wireless network connection device 1 gradually moves far away from the originally connected AP 41. At this time, it is known from the packet in the data transmission with the AP 41 that the SS corresponding to the AP 41 gradually decreases. Therefore, the control module 30 may increase the gain in a timely manner according to the decreased SS in order to maintain the constant connection with the AP 41. As can be seen from FIG. 3B, the increase of the gain of the RF module 10 enlarges the coverage of the wireless network connection device 1, such that the coverage further includes an AP 44, and too much interference or background noise may therefore be generated. However, in this state, the more important objective is to maintain the connection with the original AP 41.

Figure 3C:
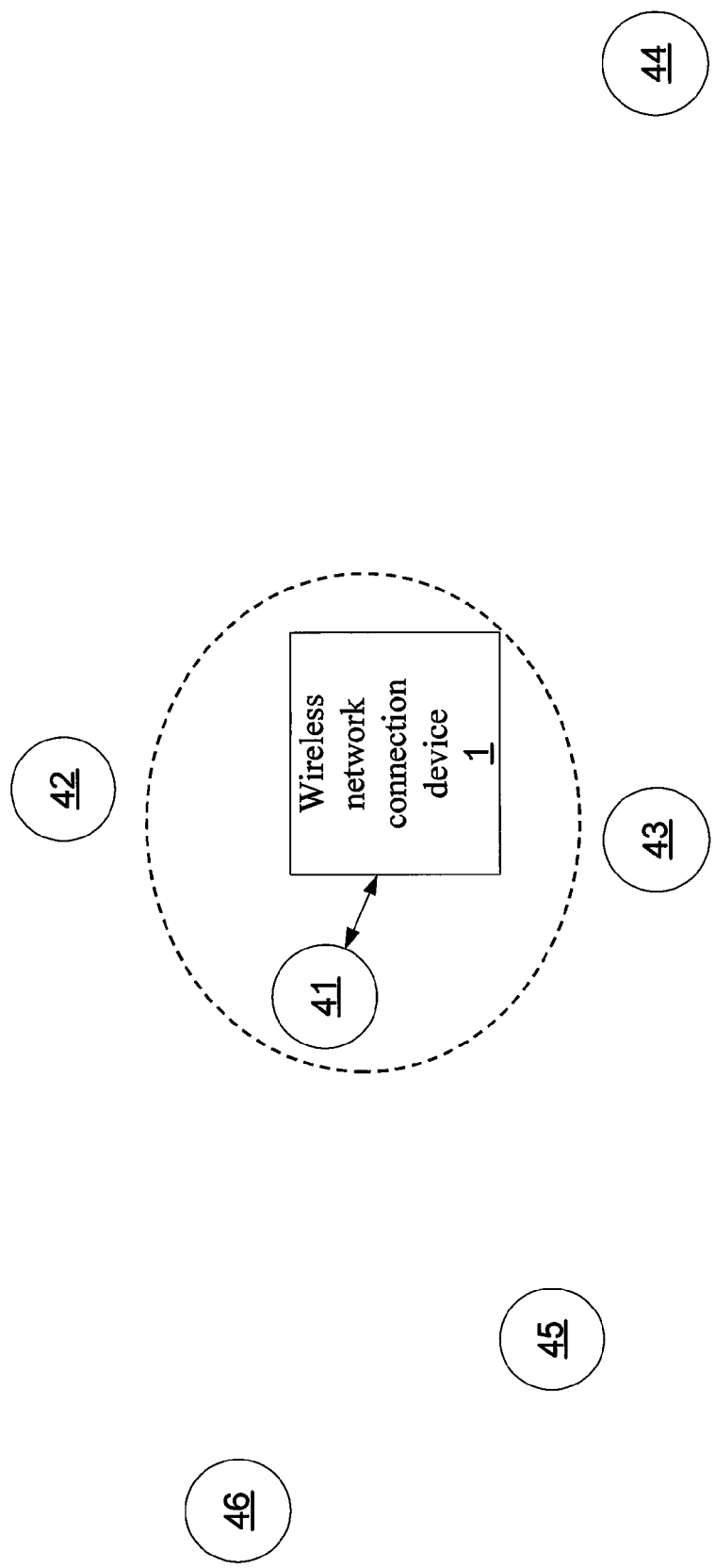
FIG. 3C is a schematic view of a third wireless network connection status according to the disclosure.

FIG. 3C is a schematic view of a third wireless network connection status according to the disclosure. In this state, when the wireless network connection device 1 gradually approaches the original AP 41, the control module 30 lowers the gain of the RF module 10 because the SS of the AP 41 becomes stronger. At this time, the coverage of the wireless network connection device 1 is also correspondingly reduced. Thus the coverage of the wireless network connection device 1 only includes the desired AP 41. That is to say, the wireless network connection device 1 can receive only the packet from the original AP 41, but cannot receive the packets of the APs 42 and 43 originally within the available coverage in the air because of the decrease of the gain. Compared with the wireless network connection device 1, the background noise is reduced, such that the wireless network environmental interference on the wireless network connection device 1 is decreased.

Figure 4:
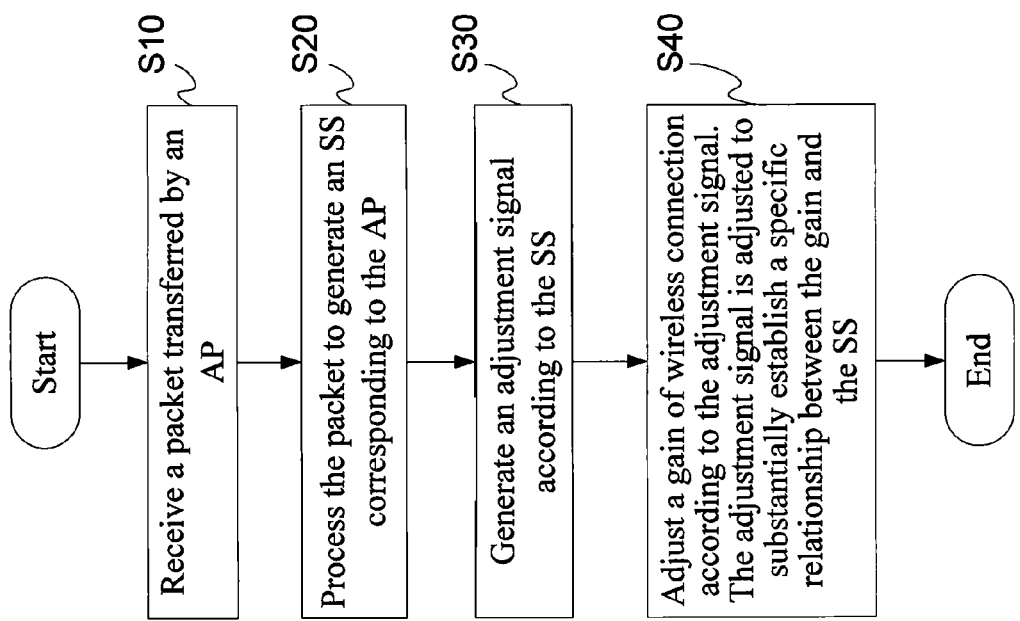
FIG. 4 is a flow chart of a wireless network connection method according to the disclosure.

FIG. 4 is a flow chart of a wireless network connection method. The embodiment provides the wireless network connection method for setting a wireless connection to an AP, which includes the following steps.

In Step S10, a packet transmitted by the AP is received. Here, the packet may be a beacon packet.

In Step S20, the packet is processed to generate an SS corresponding to the AP. After the SS is generated, a predetermined value is subtracted from the SS.

In Step S30, an adjustment signal is generated according to the SS. After the adjustment signal is generated, the adjustment signal is stored in a register.

In Step S40, a gain of wireless connection is adjusted according to the adjustment signal. The adjustment signal is adjusted to substantially establish a specific relationship between the gain and the SS. Here, the specific relationship may be an inversely proportional relationship, that is, the gain is adjusted such that the gain is inversely proportional to the SS. The gain may be a gain of the RF module.

In addition to the above steps, the method may further include the following steps. An updated value of the SS is extracted at a predetermined time interval. The adjustment signal is updated according to the updated value. The gain of the wireless connection is adjusted dynamically.

While the disclosure has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A wireless network connection device, for wireless connecting to an access point (AP), comprising:
    a radio frequency (RF) module, for receiving a packet transmitted by the AP;
    a base band (BB) module, for processing the packet to generate a signal strength (SS) corresponding to the AP; and
    a control module, for generating an adjustment signal according to the SS and adjusting a gain of the RF module according to the adjustment signal, wherein the adjustment signal is adjusted to substantially establish a specific relationship between the gain and the SS.

2. The wireless network connection device according to claim 1, wherein the specific relationship is an inversely proportional relationship.

3. The wireless network connection device according to claim 1, wherein the packet is a beacon packet.

4. The wireless network connection device according to claim 1, wherein the control module extracts an updated value of the SS from the BB module at a predetermined time interval to update the adjustment signal to dynamically adjust the gain of the RF module.

5. The wireless network connection device according to claim 1, wherein the RF module comprises a low noise amplifier (LNA) and a voltage gain amplifier (VGA).

6. The wireless network connection device according to claim 5, wherein the control module adjusts a gain of the LNA or/and a gain of the VGA according to the adjustment signal.

7. The wireless network connection device according to claim 1, wherein the BB module comprises:
    a register, for storing the adjustment signal generated by the control module, wherein the BB module transmits the adjustment signal to the RF module.

8. The wireless network connection device according to claim 1, wherein the control module comprises a media access control (MAC) layer.

9. The wireless network connection device according to claim 1, wherein the control module receives the SS and subtracts a predetermined value from the SS.

10. The wireless network connection device according to claim 9, wherein the predetermined value is substantially not smaller than 3 dB.

11. The wireless network connection device according to claim 10, wherein the predetermined value is substantially 10 dB.

12. A wireless network connection method, used for setting a wireless connection to an access point (AP), comprising:
    receiving a packet transmitted by the AP;
    processing the packet to generate a signal strength (SS) corresponding to the AP;
    generating an adjustment signal according to the SS; and
    adjusting a gain of the wireless connection according to the adjustment signal, wherein the adjustment signal is adjusted to substantially establish a specific relationship between the gain and the SS.

13. The wireless network connection method according to claim 12, wherein the specific relationship is an inversely proportional relationship.

14. The wireless network connection method according to claim 12, wherein the packet is a beacon packet.

15. The wireless network connection method according to claim 12, further comprising:
    extracting an updated value of the SS at a predetermined time interval;
    updating the adjustment signal according to the updated value; and
    adjusting the gain of the wireless connection dynamically.

16. The wireless network connection method according to claim 12, wherein after generating the SS, the method comprises:
    subtracting a predetermined value from the SS.

17. The wireless network connection method according to claim 16, wherein the predetermined value is substantially not smaller than 3 dB.

18. The wireless network connection method according to claim 17, wherein the predetermined value is substantially 10 dB.

* * * * *